United States Patent
Longacre, Jr. et al.

(10) Patent No.: US 6,655,595 B1
(45) Date of Patent: *Dec. 2, 2003

(54) BAR CODE READER CONFIGURED TO READ FINE PRINT BAR CODE SYMBOLS

(75) Inventors: Andrew Longacre, Jr., Skaneateles, NY (US); Robert M. Hussey, Camillus, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 09/799,896

(22) Filed: Mar. 6, 2001

Related U.S. Application Data (63) Continuation of application No. 09/187,722, filed on Nov. 5, 1998, now Pat. No. 6,264,105.

(51) Int. Cl.[7] .................................................. G06K 9/18
(52) U.S. Cl. ............................ 235/462.1; 235/462.11; 235/462.08
(58) Field of Search .................... 235/462.1, 462.11, 235/462.12, 462.24, 462.25, 462.08, 462.09

(56) References Cited

U.S. PATENT DOCUMENTS 6,264,105 B1 * 7/2001 Longacre et al. ........ 235/462.1

* cited by examiner

Primary Examiner—Karl D. Frech
(74) Attorney, Agent, or Firm—Wall Marjama & Bilinski LLP (57) ABSTRACT

In the present invention, a bar code reader captures an initial image map corresponding to a scene, then subjects the initial image map to an interpolation step wherein values for constructed pixels positionally intermediate pixel values of the initial image map are interpolated as a function of the initial image map pixel values bordering the constructed pixels. After an interpolated image map is constructed, the interpolated image map is subjected to a binarization step wherein grey scale pixel values of the interpolated image map are converted into binary (1 or 0) pixel values by way of a thresholding process. In the thresholding process, grey scale pixel values are compared to a threshold in the grey scale range, then set to 1 if they are above the threshold and set to 0 if below the threshold. The pixel values of the resulting binarized interpolated image map are then analyzed to determine the identity of a message which may be encoded in any symbol which may be represented in the binarized interpolated image map.

38 Claims, 6 Drawing Sheets

|   |   |   |   |
|---|---|---|---|
| 0 | 0 | 0 | 1 |
| 0 | 1 | 1 | 1 |
| 0 | 1 | 1 | 1 |
| 1 | 1 | 1 | 1 |

BLACK/WHITE THRESHOLD = 120

PRIOR ART

FIG. 5

|   |   |   |   |   |   |   |
|---|---|---|---|---|---|---|
| 0 | 0 | 0 | 0 | 0 | 1 | 1 |
| 0 | 0 | 0 | 0 | 1 | 1 | 1 |
| 0 | 0 | 1 | 1 | 1 | 1 | 1 |
| 0 | 0 | 1 | 1 | 1 | 1 | 1 |
| 0 | 0 | 1 | 1 | 1 | 1 | 1 |
| 1 | 1 | 1 | 1 | 1 | 1 | 1 |
| 1 | 1 | 1 | 1 | 1 | 1 | 1 |

BLACK/WHITE THRESHOLD = 120

POSITION

UP

DOWN

LEFT

RIGHT

FIG. 8

HEIGHT

TALLER

SHORTER

WIDTH

WIDER

NARROWER

BAR CODE READER CONFIGURED TO READ FINE PRINT BAR CODE SYMBOLS

CROSS REFERENCE TO RELATED APPLICATION

This is a continuation application of U.S. Ser. No. 09/187,722, filed Nov. 5, 1998, now U.S. Pat. No. 6,264,105, the entirety of which is incorporated herein by reference.

FIELD OF THE INVENTION

This invention relates generally to optical readers in general and, in particular, to an optical reader configured to read fine print bar code symbols.

BACKGROUND OF THE INVENTION

Bar code symbols are being employed in an ever-increasing number of applications, and the information requirements of such symbols are growing.

In recent years, there has been an increasing effort to encode large amounts of data into bar code symbols. New bar code symbol types, including 2d symbols such as stacked 1D and matrix symbols have become available which are specifically designed to increase the amount of data per area that can be encoded into a symbol.

In addition to utilizing new types of bar code symbols, users of bar code symbols have been printing such symbols in smaller sizes and in increasingly higher densities. The bar and space patterns of bar code symbols, whether 1D or 2D, are being printed and applied to items in increasingly finer prints.

The fine print of many bar code symbols in use today has resulted in an increase in the resolution requirements of optical reading devices which read such symbols. In the prior art, there has been suggested, in general, two approaches for addressing these increased resolution requirements.

The first approach suggested in the prior art for increasing reader resolution is to increase the pixel density of an image sensor used in an optical reader. This solution is highly effective performance-wise, but is also highly expensive. For purposes of illustrating the cost of increasing pixel density, a 1000 by 1000 pixel array sensor is currently approximately 8 times the cost of a 256 by 256 pixel array sensor. Incorporating a higher density pixel array into a reader also significantly increases data storage and data processing costs.

A second approach suggested by the prior art for increasing reader resolution is to adjust the reader optics so as to increase the magnification of captured scenes. This solution comes with the price of decreasing the area of the reader's field of view, however.

There is a need for a low cost high performance optical reader which is capable of reading fine print bar code symbols which are finding increased use.

SUMMARY OF THE INVENTION

According to its major aspects and broadly stated, the present invention is a method for decoding fine print bar code symbols. The method includes certain image data processing steps which facilitate the reading of finer print symbols without requiring that the resolution of the reader be enhanced by altering hardware aspects of the reader.

In the present invention, a bar code reader captures an initial image map corresponding to a scene, then subjects the initial image map to an interpolation step wherein values for constructed pixels (pixel positionally intermediate between pixels of the initial image map) are interpolated as initial bit map are interpolated as a function of the initial image map pixel values bordering the constructed pixels.

After an interpolated image map is constructed, the interpolated image map is subjected to a binarization step wherein grey scale pixel values of the interpolated image map are converted into binary (1 or 0) pixel values by way of a thresholding process. In the thresholding process, grey scale pixel values are compared to a threshold (which may vary across the image) in the grey scale range, then set to 1 if they are above the threshold and set to 0 if below the threshold.

The pixel values of the resulting binarized interpolated image map are then analyzed to determine the identity of a message which may be encoded in any symbol which may be represented in the binarized interpolated bit map.

Interpolating constructed pixel values before binarizing the interpolated bit map decreases the amount of image information that would otherwise be lost by binarizing an initially captured bit map image directly as in a prior art decoding method.

These and other details, advantages and benefits of the present invention will become apparent from the detailed description of the preferred embodiment hereinbelow.

BRIEF DESCRIPTION OF THE DRAWINGS

For a fuller understanding of the nature and objects of the invention, references should be made to the following detailed description of a preferred mode of practicing the invention, read in connection with the accompanying drawings, in which.

DETAILED DESCRIPTION OF THE PREFERRED EMBODIMENT

Figure 1:
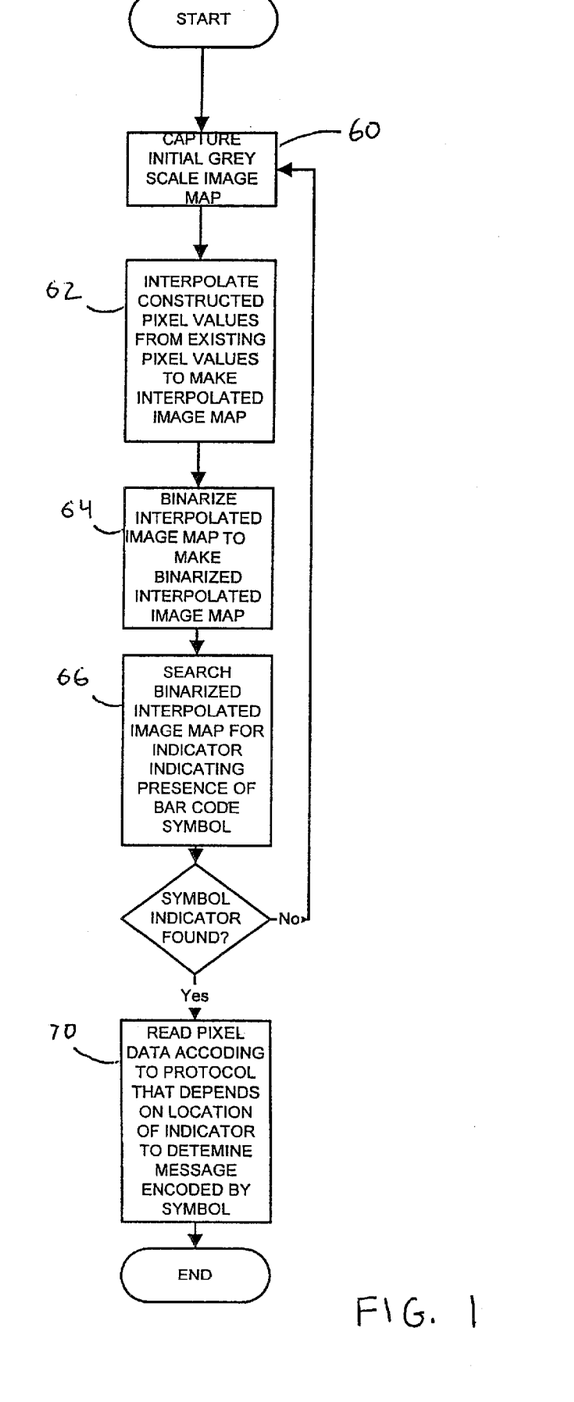
FIG. 1 is a flow diagram illustrating operation of a reader configured in accordance with the invention.
Figure 2:
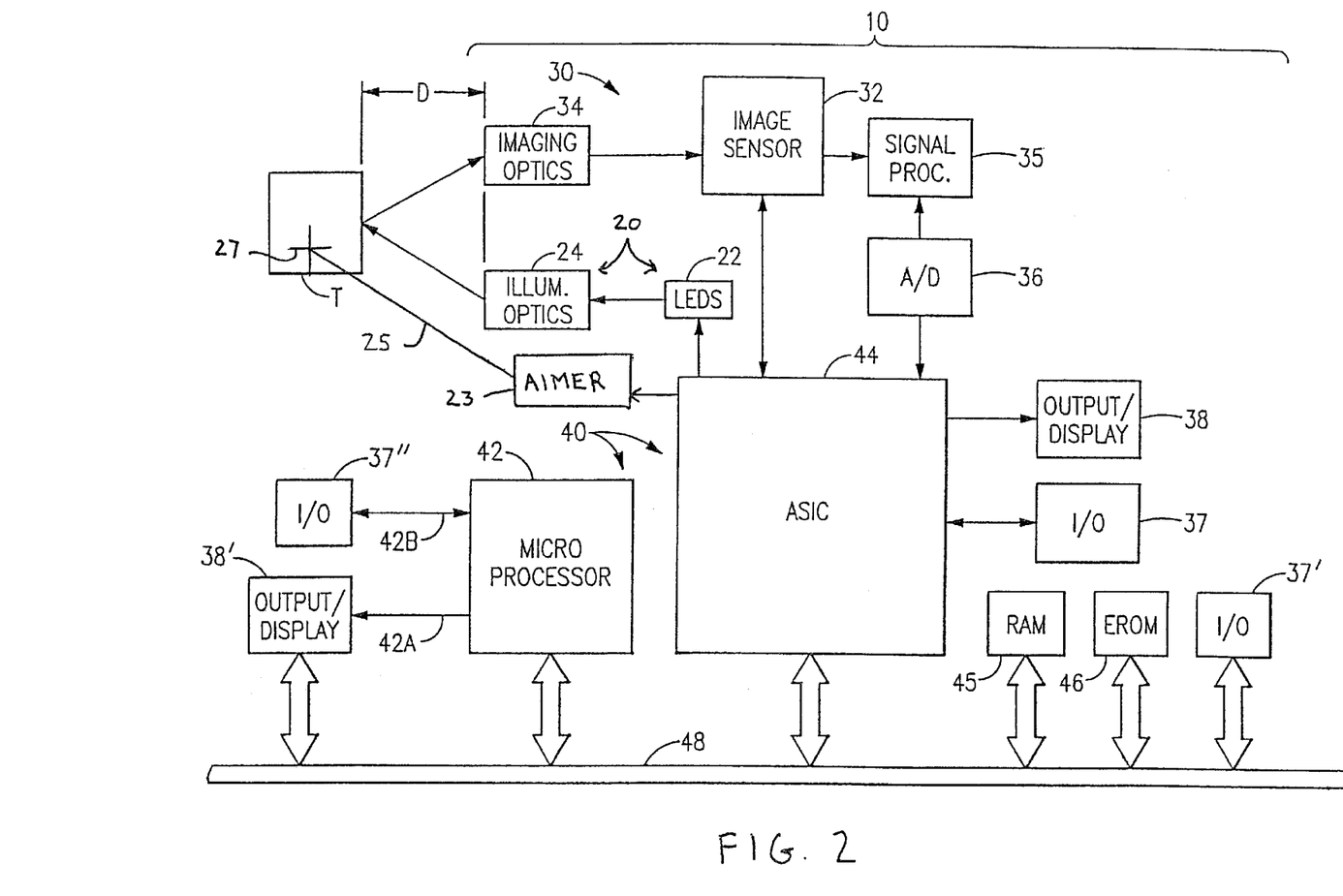
FIG. 2 is a block diagram of a bar code reader in which the invention may be incorporated.

A flow diagram illustrating operation of a reader configured in accordance with the invention is shown in FIG. 1 while a block diagram of an optical reader of the type in which the present invention may be incorporated is shown in FIG. 2. Optical reader 10 includes an illumination assembly 20 for illuminating a target object T, such as a 1D or 2D bar code symbol, and an imaging assembly 30 for receiving an image of object T and generating an image of object T and generating an electrical output signal indicative of the data optically encoded therein. Reader 10 may further include an aimer 23 which generates an aiming or spotter beam 25 to project a spotter patter 27 at or about a target object T. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated if ambient light levels are certain to be high enough to allow high quality images of object T to be taken. Imaging assembly 30 may include an image sensor 32, such as a 2D CCD or CMOS solid state image sensor, together with an imaging optics assembly 34 for receiving and focusing an image-of object T onto image sensor 32. The array-based imaging assembly shown in FIG. 2 may be replaced by a laser scanning based imaging assembly comprising a laser source, a scanning mechanism, emit and receive optics, a photodetector and accompanying signal processing circuitry.

Optical reader 10 of FIG. 2 also includes programmable-controller 40 which preferably comprises an integrated circuit microprocessor 42 and an application specific integrated circuit or ASIC 44. Processor 42 and ASIC 44 are both programmable control devices which are able to receive, output and process date in accordance with a stored program stored in either or both of a read/write random access memory or RAM 45 and an erasable read only memory or EROM 46. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

Figure 8:
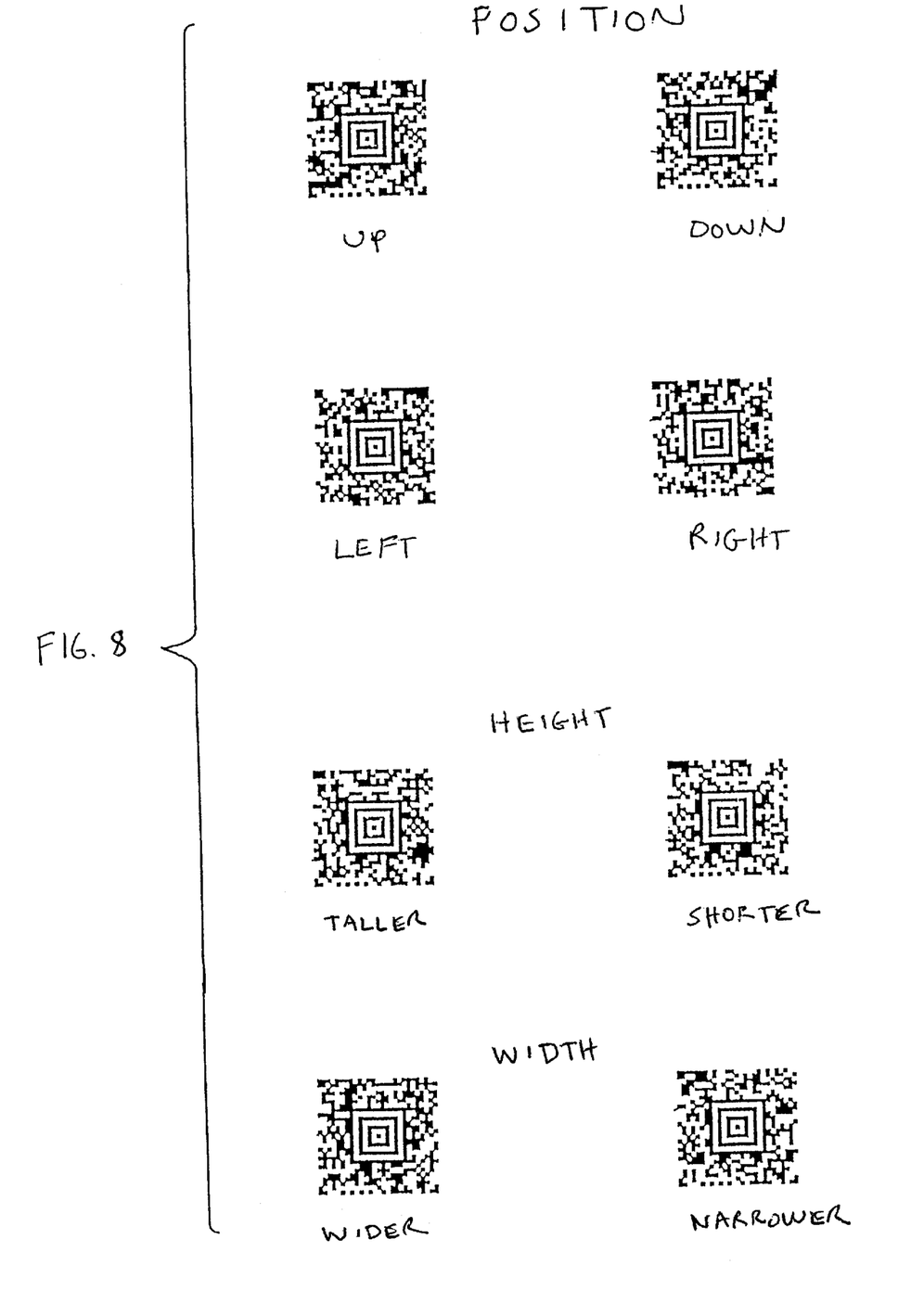
FIG. 8 shows an exemplary menu sheet which may be used to alter the position, shape, or size of a region of interest.

More particularly, processor 42 is preferably a general purpose, off-the-shelf VLSI integrated circuit microprocessor which has overall control of the circuitry of FIG. 8, but which devotes most of its time to decoding image data stored in RAM 45 in accordance with program data stored in EROM 46. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 2, a typical division of labor between processors 42 and 44 will be as follows. Processor 42 is preferably devoted primarily to the tasks of decoding image data, once such data has been stored in RAM 45, handling the menuing options and reprogramming functions, and providing overall system level coordination. Processor 44 is preferably devoted primarily to controlling the image acquisition process, and A/D conversion process and the storage of image data, including the ability to access memories 45 and 46 via a DMA channel. Processor 44 may also perform many timing and communication operations. Processor-44 may, for example, control the illumination of LEDs 22, the timing of image sensor 32 and an analog-to-digital (A/D) converter 36, the transmission and reception of data to and from a processor external to reader 10, through an RS-232 (or other) compatible I/O device 37 and the outputting of user perceptible data via an output device 38, such as a beeper, a good read LED and/or a liquid crystal display. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37' and 38'. As explained-earlier, the specifics of this division of labor is of no significance to the present invention.

Referring now to particular aspects of the invention, an exemplary embodiment of the invention is described with reference to the flow diagram of FIG. 1 and the pixel map diagrams shown in FIGS. 3–6.

Figure 3:
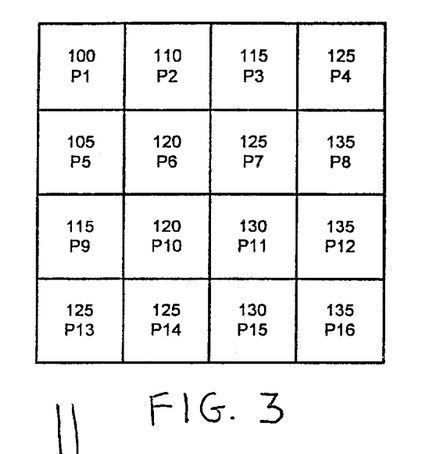
FIG. 3 is a representation of an initial grey scale bit map.

In accordance with the invention, reader 10 at block 60 captures an initial grey scale bit map that is represented by the pixel map of FIG. 3. The term "capture" as used herein shall refer generally to a process involving processing analog signals from imaging assembly 30, converting these signals into digital form, presenting them to controller 40 and generating therefrom an initial image map representation or other memory-stored representation of the captured image.

The grey scale image map includes one word of data per pixel, each word normally having between 4 and 8 bits. Preferably each word contains 8 bits, and represents a grey scale pixel value of between 0 and 255, 0 representing absolute black and 255 representing absolute white. The dimension of the initial grey scale bit map corresponds to the pixel dimension of pixel array. Common dimensions for a pixel array are 494 by 659 pixels or 574 by 768 pixels, for example. A simplified 4×4pixel map is shown in FIG. 3 for purposes of describing the invention.

In a prior art decoding scheme, the initial image map represented in FIG. 3 is subjected to a binarization process immediately after being captured. The image map is binarized by way of a thresholding process wherein each pixel value is compared to an arbitrary threshold within the grey scale range. This threshold may be an arbitrary threshold within the grey scale range, but is preferably a variable threshold whose value varies depending on the value of pixels in proximity with the pixel currently being binarized. Each pixel value above the threshold is set to 1, while each pixel value below the threshold value is set to zero. A binarized representation of the image map of FIG. 3 binarized using a constant threshold of t=120 is shown in FIG. 5.

Figure 5:
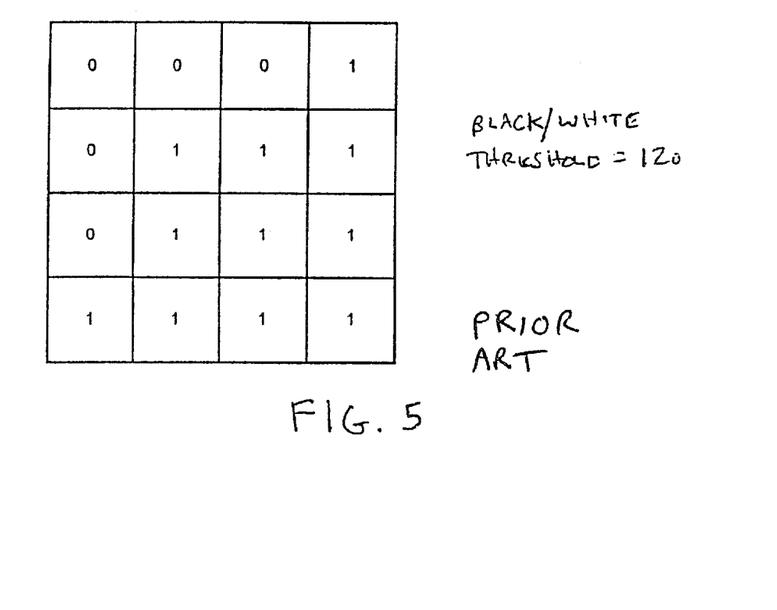
FIG. 5 is a representation of a binarized image map binarized from the initial bit map shown in FIG. 2.

In the prior art decoding method, the next step in the decoding process is to analyze the binarized image map as represented by FIG. 5 to determine the information encoded by any bar code which may be contained in the pixel data. In a typical decoding algorithm, the analysis of the pixel data to determine the information encoded by any bar code includes the steps of (1) determining if an indicator (such as a bulls eye) is present indicating that a representative of a certain symbol contained a bar code certain: symbology is contained in the image data, (2) reading captured pixel data according to a protocol that depends on a location of the indicator to determine the message encoded by a symbol. In the present invention, as illustrated by block 63 of the flow diagram of FIG. 1 controller 40 executes an intermediate interpolation step before binarizing grey scale pixel values. In an interpolation step, controller 40 interpolates pixel values for "constructed" pixels positionally intermediate of pixels in the initial image map.

Figure 4:
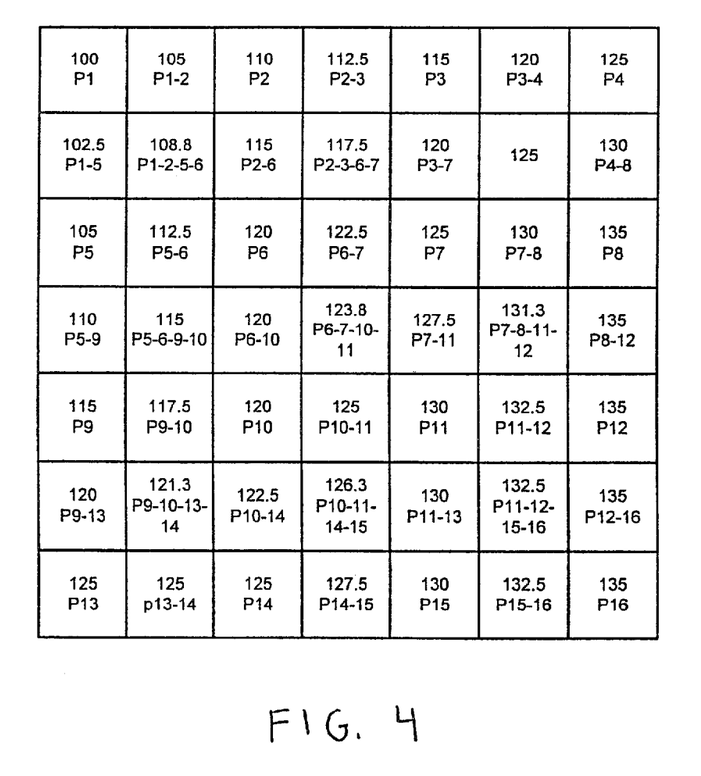
FIG. 4 is a representation of an interpolated image map interpolated from the bit map shown in FIG. 2.

An exemplary interpolated image map is shown in FIG. 4. The interpolated image map shown in FIG. 4 is developed from the initial image map shown in FIG. 3 by interpolating values for constructed pixels between the pixels of the initial image map. The value of each constructed pixel may be a function of the values of its bordering pixels. For example, $P_{1-2}$ may be a function of $p_1$ and $P_2$, and $P_{2-3}$ may be a function of $_{P2}$ and $p_3$ and so on. Center constructed pixel $P_{1-2-5-6}$ may be a function of pixels $P_1$, $P_2$, $p_5$ and $p_6$. In a typical embodiment, each constructed pixel is interpolated by averaging its neighboring pixels. It is seen that in the construction of the interpolated image map of FIG. 4 three constructed pixel values are interpolated for each one pixel of the original image map.

After constructing the interpolated image map at block 62, controller 40 at block 64 binarizes the interpolated image map. This binarization step may be carried out in the same manner that an initial image map is binarized as described previously in connection with FIGS. 2 and 4, that is, by a thresholding process wherein each pixel value in the image map is compared to a threshold and then set 1 if above the threshold and to 0 if below the threshold. Interpolating the initial grey scale image map to create an interpolated image map before binarizing the image map reduces the amount of image information lost by binarizing grey scale image data.

At blocks 66 and 70 controller 40 analyses the binarized interpolated image map generated at block 64 in order to determine the information represented in the binarized interpolated image map. As described previously in connection with FIG. 5, such analysis can include the steps of (1) determining if an indicator indicating the presence of a symbol of a certain symbology is present in the image data and (2) reading the pixel data according to a protocol that depends on the location of the indicator to determine the message encoded by a symbol.

Controller 40 can be programmed so that the controller interpolates an entire initial image map prior to binarizing the bits of an interpolated image map. In an alternative embodiment of the invention, the controller can be programmed to interpolate constructed pixel values for less than all pixel values of the image map. In one particular embodiment, controller 40 can be made to interpolate constructed pixel values only in predetermined areas of an image map.

Figure 6:
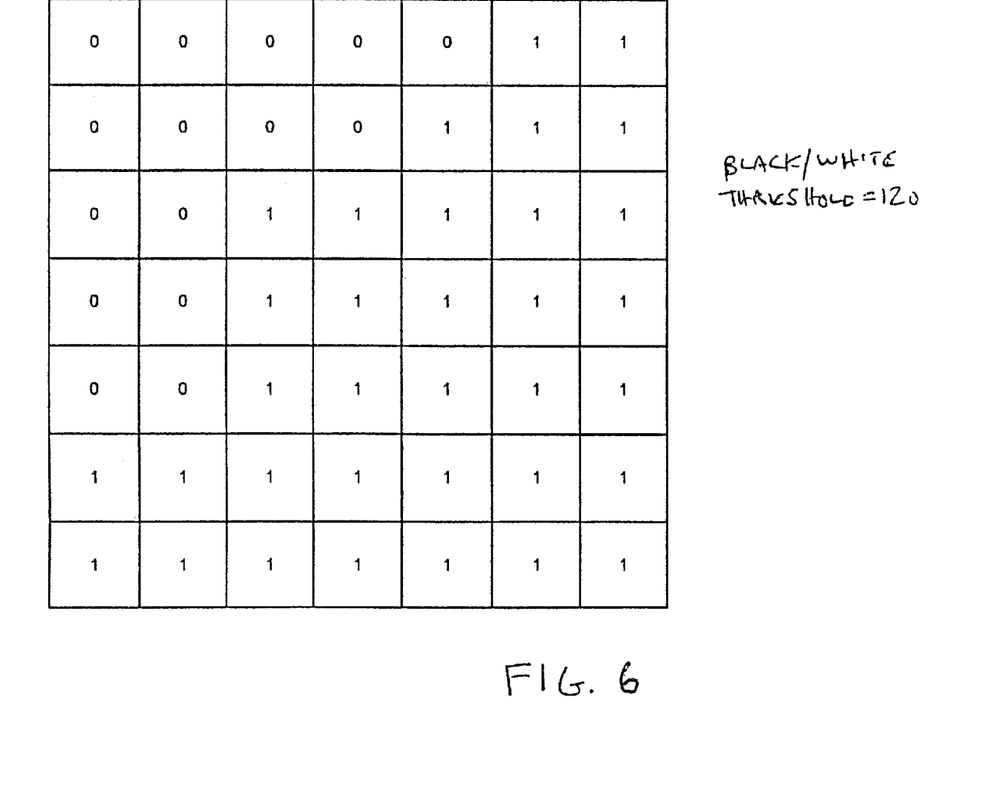
FIG. 6 is a representation of a binarized image map binarized from the interpolated bit map shown in FIG. 3.
Figure 7:
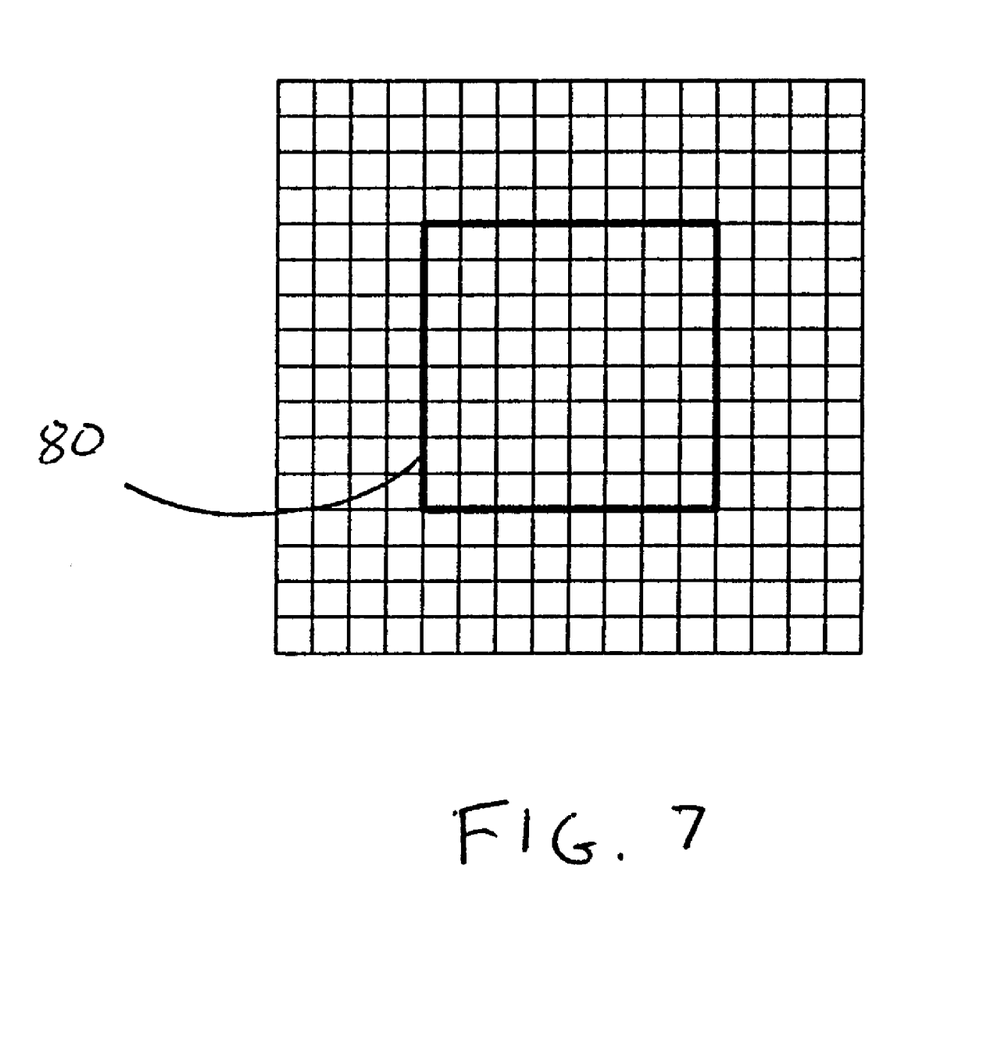
FIG. 7 is a representation of an initial image map including a region of interest which is selectively subjected to an interpolation step in accordance with the invention.

A representation of an image map in which less than all pixels of an image map are interpolated is shown in FIG. 6. In this embodiment, constructed pixels are interpolated only from those pixels within a region of interest defined by boundary 80. Adapting the reader 10 to interpolate pixel values from less than all of the pixels in an initial image map reduces the time required to decode a symbol contained in a scene or to otherwise process the captured image information.

The invention can be adapted so that the region of interest defined by boundary 80 can be altered in response to user generated commands. In various alternative embodiments, the region of interest can be made larger or smaller, the shape of the region of interest can be changed, and the position of the region of interest can be moved in response to user generated commands.

The user generated commands which result in the region of interest being altered can be initiated by manual control inputs which may be provided on the reader itself or by control inputs of a peripheral device in communication with the reader. For example, the user generated commands may be initiated through use of a keyboard of a personal computer in communication with reader.

User generated commands resulting in altering of the size, shape and/or position of the region of interest can also be generated by reading of menu symbols, typically contained on a menu sheet as shown in FIG. 8. Menu symbols are symbols which when read and recognized by reader 10 result in the reader being reprogrammed in a certain way. Region of interest menu symbols as illustrated in FIG. 8 can be provided to result in the region of interest changing in position, shape, or size.

Changing the position, shape or size of a region of interest may be beneficial to the operation of the reader in a variety of operational situations. For example, it may be beneficial to change the position of boundary 80 as the reading depth of the reader changes. In some readers which include an aimer, such as aimer 23, an aimer projects an aiming pattern, such as pattern 27 centered at a point represented in pixels above a center pixel of a captured image when the reader is used to capture scenes at close range. When these readers are used to capture images at close range, it may be beneficial to adjust the position of boundary 80 upward in a pixel array so that the region of interest corresponds to an area of a scene highlighted by an aiming or spotter pattern.

In addition to making the size, shape, and/or position of a region of interest responsive to user generated commands, the size, shape and position of a region of interest can be made responsive to sensed features of a captured image.

For example, the size, shape, and position of a region of interest which is subjected to an interpolation step can be made responsive to features of a captured image which correspond to specific points of a bar code symbol. The decoding algorithm for decoding symbols of some symbologies begins with the step of locating a specific point of the symbol (typically a bulls eye) in captured image data. In one embodiment of the invention, the reader is configured so that the region of interest is a predetermined area of a pixel array about a pixel location corresponding to a bulls eye of a symbol.

Bar code readers typically search for and locate bulls eyes or other indicators of bar code symbols in binarized image data that has been binarized from an initial grey scale image map. Thus, readers that are configured to define a region of interest based on a location of a bullseye or another indicator of a symbol normally will be made to binarize an entire initial image map, determine the location of an indicator, define a region of interest based on the location of an indicator, and then interpolate constructed pixel values only within the region of interest.

A reader according to the invention can also be made to define a region of interest based on features of image data of an initial grey scale image map (without first binarizing an initial image and searching for and locating features of image data in a binarized image map). For example, a reader according to the invention can be made to define a region of interest within an initial image map by measuring "energy" (the strength and number of transitions in an area of the image map) or another feature of the initial image map image data. Readers configured as such will decode bar code symbol, in general, by capturing an initial grey scale image map, detecting a feature of the initial image map, defining a region of interest within the initial image map based on the detected feature, interpolating constructed pixel values within the region of interest to form an interpolated image map, binarizing pixel values from the interpolated image map, and analyzing the binarized interpolated image map to determine a message encoded by a symbol.

In another embodiment of the invention, the reader can be configured so that the region of interest defined by boundary 80 expands if certain features of pixel data in a captured pixel array are sensed. In the example of FIG. 6, an initial region of interest is defined by boundary 80. If during the image data analysis process, it is determined that an entire symbol is contained within boundary 80, then the region of interest is not expanded. In an embodiment of the invention including the expandable region of interest feature, however, then the reader expands the region of interest if while analyzing image data, the reader determines that an entire symbol is not contained within a region of interest.

While the present invention has been explained with reference to the structure disclosed herein, it is not confined to the details set forth and this invention is intended to cover any modifications and changes as may come within the scope of the following claims:

What is claimed is:

1. An imaging device comprising a controller and an imaging assembly in communication with said controller, said device being adapted to:

capture a first grey scale image map corresponding to a scene;

define a region of interest within said image map comprising a subset of pixels of said first grey scale image map;

interpolate constructed pixel values only from those pixel values corresponding to pixel locations within said region of interest to form an interpolated image map within said region of interest; and binarize said interpolated image map to form a binarized interpolated image map so that a region of said scene corresponding to said region of interest is represented by a binary image map comprising a greater number of pixel values per unit scene area than is represented by said first grey scale image map.

2. The device of claim 1, wherein said device establishes said region of interest to correspond to an aiming pattern of said device.

3. The device of claim 1, wherein said device is further adapted to adjust at least one of a size, a shape, or a position of said region interest.

4. The device of claim 1, wherein said device is further adapted to read a region of interest menu symbol to adjust at least one of a size, a shape, or a position of said region of interest.

5. The device of claim 1, wherein said device is further adapted, when interpolating pixel values, to average pixel values from said initial image map which border positions of said constructed pixel values.

6. The device of claim 1, wherein said device is further adapted to locate a symbology indicator, and define said region of interest about said indicator.

7. The device of claim 1, wherein said device is further adapted to compare pixel values in said binarized interpolated image map to a threshold within a grey scale range.

8. The device of claim 1, wherein said device is further adapted to adjust said region of interest in response to sensed features of said first grey scale image map.

9. The device of claim 1, wherein said device is further adapted to ascertaining whether an entire symbol is contained within said region of interest, and expand said region of interest if an entire symbol is not contained within said region of interest.

10. The device of claim 1, wherein said device is further adapted to, when defining said region of interest, sense a feature of said first grey scale image map, and establish said region of interest based on said sensed feature of said first grey scale image map.

11. The device of claim 1, wherein said device is further adapted to sense transitions of said first grey scale image map.

12. The device of claim 1, wherein said device is further adapted to attempt to decode decodable image data represented in said binary image map.

13. The imaging device of claim 1, further including a hand held housing encasing said imaging assembly and further being adapted to attempt to decode a bar code symbol within said binarized interpolated image map.

14. The imaging device of claim 1, further including a hand held housing encasing said imaging assembly and further being adapted to attempt to decode a bar code symbol within said binarized interpolated image map, wherein said imaging device defines an initial region of interest at a center of said grey scale image map.

15. The imaging device of claim 1, further including a hand held housing encasing said imaging assembly and further being adapted to attempt to decode a bar code symbol within said binarized interpolated image map, wherein said imaging device defines an initial region of interest at a center of said grey scale image map, and wherein said imaging device is adapted to adjust a position of said region of interest in response to processing Of image data.

16. The imaging device of claim 1, further including a hand held housing encasing said imaging assembly and further being adapted to attempt to decode a bar code symbol within said binarized interpolated image map, wherein said imaging device defines an initial region of interest at a center of said grey scale image map, and wherein said imaging device is adapted to expand said region of interest if while analyzing image data, said imaging device determines that an entire symbol representation is not included in a present region of interest.

17. The imaging device of claim 1, further including a hand held housing encasing said imaging assembly and further being adapted to attempt to decode a bar code symbol within said binarized interpolated image map, wherein a dimension of said region of interest is predetermined.

18. The imaging device of claim 1, further including a hand held housing encasing said imaging assembly and further being adapted to attempt to decode a bar code symbol within said binarized interpolated image map, wherein a size of said region of interest is predetermined.

19. The imaging device of claim 1, further including a hand held housing encasing said imaging assembly and further being adapted to attempt to decode a bar code symbol within said binarized interpolated image map, wherein said device establishes said region of interest to correspond to an aiming pattern of said device.

20. The imaging device of claim 1, further including a hand held housing encasing said imaging assembly and further being adapted to attempt to decode a bar code symbol within said binarized interpolated image map, wherein said device is further adapted to adjust at least one of a size, a shape, or a position of said region interest.

21. The imaging device of claim 1, further including a hand held housing encasing said imaging assembly and further being adapted to attempt to decode a bar code symbol within said binarized interpolated image map, wherein said device is further adapted to read a region of interest menu symbol to adjust at least one of a size, a shape, or a position of said region of interest.

22. The imaging device of claim 1, further including a hand held housing encasing said imaging assembly and further being adapted to attempt to decode a bar code symbol within said binarized interpolated image map, wherein said imaging device is further adapted to define a region of interest by measuring a number of transitions in an area of said first grey scale image map.

23. The imaging device of claim 1, further including a hand held housing encasing said imaging assembly and further being adapted to attempt to decode a bar code symbol within said binarized interpolated image map, wherein said device is further adapted, when interpolating pixel values, to average pixel values from said initial image map which border positions of said constructed pixel values.

24. The imaging device of claim 1, further including a hand held housing encasing said imaging assembly and further being adapted to attempt to decode a bar code symbol within said binarized interpolated image map, wherein said device is further adapted to locate a symbology indicator, and define said region of interest about said indicator.

25. The imaging device of claim 1, further including a hand held housing encasing said imaging assembly and further being adapted to attempt to decode a bar code symbol within said binarized interpolated image map, wherein said device is further adapted to compare pixel values in said binarized interpolated image map to a threshold within a grey scale range.

26. The imaging device of claim 1, further including a hand held housing encasing said imaging assembly and further being adapted to attempt to decode a bar code symbol within said binarized interpolated image map, wherein said device is further adapted to adjust said region of interest in response to sensed features of said first grey scale image map.

27. The device of claim 25, wherein said device is further adapted to ascertain whether an entire symbol is contained within said region of interest, and expand said region of interest if an entire symbol is not contained within said region of interest.

28. The imaging device of claim 1, further including a hand held housing encasing said imaging assembly and further being adapted to attempt to decode a bar code symbol within said binarized interpolated image map, wherein said device is further adapted to, when defining said region of interest, sense a feature of said first grey scale image map, and establish said region of interest based on said sensed feature of said first grey scale image map.

29. The imaging device of claim 1, further including a hand held housing encasing said imaging assembly and further being adapted to attempt to decode a bar code symbol within said binarized interpolated image map, wherein said device is further adapted to sense transitions of said first grey scale image map.

30. The imaging device of claim 1, further including a hand held housing encasing said imaging assembly and further being adapted to attempt to decode a bar code symbol within said binarized interpolated image map, wherein said device is further adapted to attempt to decode decodable image data represented in said binary image map.

31. A method for processing image data using an imaging device, said method comprising the steps of:
 capturing a first multipixel image representation corresponding to a scene, wherein each pixel value of said multipixel image representation comprises at least two data bits;
 utilizing a subset of pixel values of said first multipixel image representation, interpolating constructed pixel values from existing pixel values of said multipixel image representation to form an interpolated multipixel image representation, wherein each pixel value of said interpolated multipixel image representation comprises at least two data bits; and
 binarizing pixel values of said interpolated multipixel image representation to form a binarized interpolated image representation, each pixel value of said interpolated multipixel image representation comprising one data bit having either a logic "1" value or a logic "0" value, wherein said binarized interpolated multipixel image representation comprises a greater number of pixel values per unit scene area than said first multipixel image representation.

32. The method of claim 31, wherein at least one pixel value of said first multipixel image representation comprises a grey scale pixel value.

33. The method of claim 31, wherein said subset of pixel values utilized for interpolating constructed pixel values is selected to correspond to an aiming pattern of said imaging device.

34. The method of claim 31, further comprising the step of adjusting said subset of pixel values utilized for interpolating constructed pixel values.

35. The method of claim 31, wherein said interpolating step includes the step of detecting for a symbology indicia representation in said first image representation and selecting said subset of interpolated constructed pixel valued based on a location of said symbology indicator representation.

36. The method of claim 31, wherein said interpolating step includes the step of ascertaining whether an entire symbol is representation by pixels of said subset of pixels, and expanding said subset of pixels if an entire symbol is not represented by said subset of pixels.

37. The method of claim 31, wherein said interpolating step includes the step of selecting said subset of pixels based on an analysis of said first multipixel image representation.

38. The method of claim 31, further comprising the step of attempting to decode a decodable symbol represented in said binarized interpolated multipixel image representation.

* * * * *